United States Patent [19]

Clendenen

[11] 4,324,308

[45] Apr. 13, 1982

[54] AID FOR STARTING MOTOR VEHICLES

[76] Inventor: Dorothy Clendenen, 205 Hampton Ct., Longview, Tex. 75601

[21] Appl. No.: 98,594

[22] Filed: Nov. 29, 1979

[51] Int. Cl.³ .......................... B60K 26/00; E05B 3/00
[52] U.S. Cl. .................. 180/315; 16/110 R; 70/254; 74/544
[58] Field of Search .......... 180/315, 320, 78; 70/254, 255, 237, 252; 74/557, 544, 545; 16/114 R, 110 R; 200/330, 331, 332, 61.54, 61.85; 3/12.8; 292/336.3

[56] References Cited

U.S. PATENT DOCUMENTS

| | | | |
|---|---|---|---|
| 428,442 | 5/1890 | Anderson | 74/557 |
| 519,354 | 5/1894 | Sheppard | 200/331 |
| 907,770 | 12/1908 | Fulton | 200/331 |
| 1,568,125 | 1/1926 | Barlow | 74/544 |
| 1,602,888 | 10/1926 | Douglas | 70/255 |
| 2,641,939 | 6/1953 | McKee | 74/544 |
| 2,796,755 | 6/1957 | Craig | 70/255 |
| 3,319,485 | 5/1967 | Tremblay | 74/543 |
| 3,507,259 | 4/1970 | Lankford | 74/544 |
| 3,559,206 | 1/1971 | Beecham | 180/78 |
| 3,648,490 | 3/1972 | Kimberlin et al. | 70/252 |
| 4,018,465 | 4/1977 | Ramler | 292/336.3 |

*Primary Examiner*—Richard A. Bertsch
*Assistant Examiner*—Donn McGiehan
*Attorney, Agent, or Firm*—Richards, Harris & Medlock

[57] ABSTRACT

An aid for turning a motor vehicle ignition switch (22) with flanges or mounts (24) comprises a handle (10) having a substantially straight portion (12) for engaging the flanges (24) and an angled portion (14) extending outwardly from the flanges (24). A knob (16) is attached to the end of the angled portion (14) of the lever arm for grasping and transmitting rotational forces to the ignition switch (22). Screws (26) are provided for connecting the handle (10) to the flanges (24).

3 Claims, 3 Drawing Figures

AID FOR STARTING MOTOR VEHICLES

TECHNICAL FIELD

The present invention relates to devices for handicapped persons, and more particularly, to an aid for facilitating the starting of motor vehicles by handicapped persons.

BACKGROUND ART

Numerous diseases such as arthritis or the like can handicap a person by reducing his manual dexterity. Reduced manual dexterity has far ranging consequences upon the afflicted person's life. A handicapped person often cannot grasp small objects necessary for daily existence, such as the ignition switch in an automobile. When the automobile is a necessity, as it is in many person's lives, inability to operate it produces serious hardships.

No satisfactory solutions presently exist to facilitate a handicapped person's operation of the ignition switch in an automobile. Recent ignition switches are equipped with flanges attached to the switch. The flanges provide an area for grasping which is larger than the handle of a key, but which is generally too small for the handicapped person to effectively grasp. Hence it is difficult for many dexterity-impaired persons to grasp and turn the ignition key in a conventional automobile.

DISCLOSURE OF THE INVENTION

The present invention is directed to an aid for turning the ignition of an automobile which enables a handicapped person to start and stop the automobile engine. The apparatus comprises an ignition switch with a mount and a lever arm attached to the mount.

In accordance with another aspect of the invention, the present aid comprises an elongated lever arm with a straight portion connected to protruding flanges of an ignition switch. The lever arm has an angled portion which extends substantially outwardly from the ignition switch, and has a knob attached to the end for grasping.

In accordance with yet another aspect of the invention, an elongated lever arm having a substantially straight portion engages a pair of flanges attached to, or part of, an ignition switch in a motor vehicle. An angled portion of the lever arm extends outwardly from the flanges, and has a knob attached to the end for grasping and rotating the lever arm. Structure is provided for connecting the lever arm to the flanges.

BRIEF DESCRIPTION OF THE DRAWINGS

A more complete understanding of the invention can be had by referring to the following Detailed Description in conjunction with the accompanying drawings, wherein.

DETAILED DESCRIPTION

Figure 1:
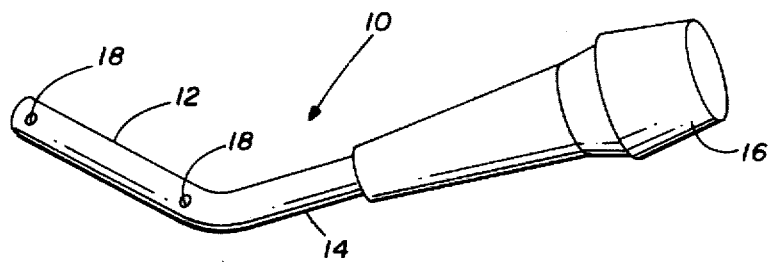
FIG. 1 is a top view of the ignition switch handle of the present invention.

Referring to the drawings wherein like numerals reference like or similar components, there is seen in FIG. 1 the ignition switch handle 10 of the present invention. The ignition switch handle 10 has a straight portion 12 and an angled portion 14 to which a knob 16 is attached. The angled portion 14 of the ignition switch handle 10 is easy to grasp, and insures that the ignition switch handle 10 will not foul with the steering wheel (not shown) of the motor vehicle. The knob 16 is attached to the end of the handle 10 to facilitate grasping and to provide an improved esthetic appearance. Threaded holes 18 in the straight portion 12 are used to mount the handle 10, as will be hereinbelow described. The ignition switch handle 10 can be made of a solid shaft with a suitable cross-sectional shape, such as a circle, a square or a hexagon. The handle 10 can also be constructed as a straight shaft, without an angled portion 14.

Figure 2:
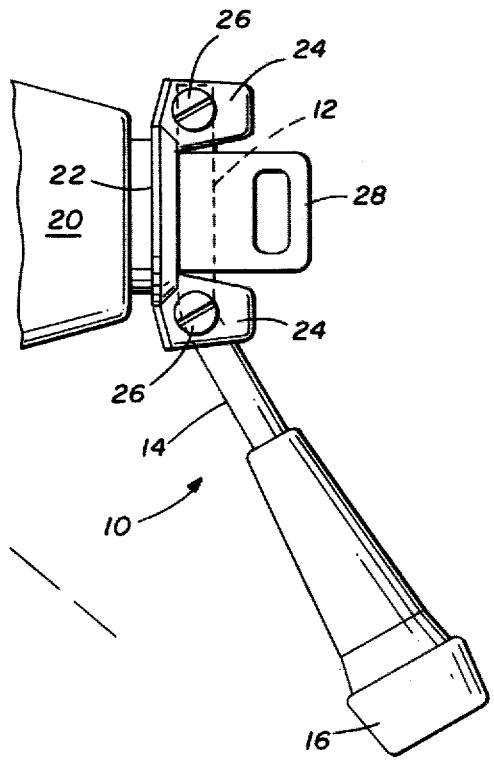
FIG. 2 is a top view of the present invention.

FIG. 2 illustrates the handle 10 of the present invention installed in a motor vehicle. As is well known, the steering column 20 of a motor vehicle generally contains an ignition switch 22 having flanges 24. Apertures are formed in each of the flanges 24. Referring to FIG. 1 in conjunction with FIG. 2, screws 26 pass through the apertures in the flanges 24 into the threaded holes 18 in handle 10 to secure the handle 10 to the flanges 24. As seen in FIG. 2, the ignition key 28 has been inserted in the ignition switch 22 above the handle 10. The handle 10 depends downwardly for a sufficient distance to allow a handicapped person to easily turn the handle 10 to rotate the key 28.

Figure 3:
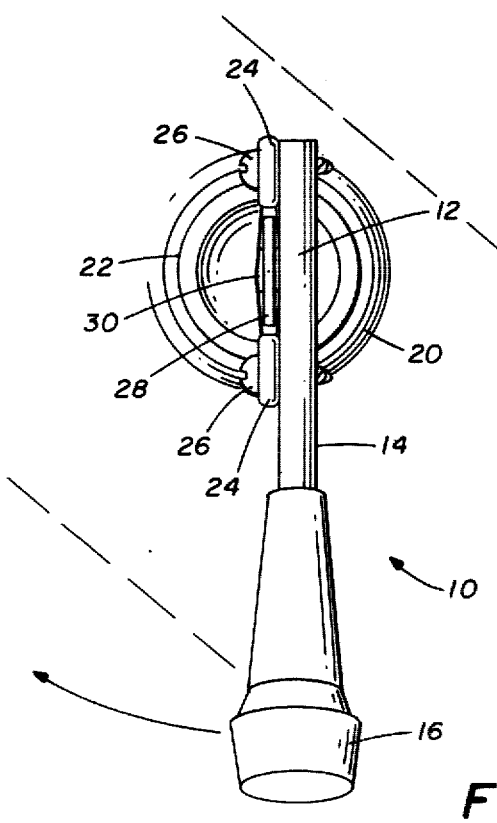
FIG. 3 is a side view of the present invention.

The ignition switch handle 10 as mounted in a motor vehicle is illustrated in a side view in FIG. 3. The ignition key 28 fits into the slot 30 of the ignition switch 22. In the illustrated embodiment, the handle 10 is mounted below the key slot 30 in the ignition switch 22. If desired, the handle 10 can be mounted above the key slot 30, and the invention will operate in the opposite manner as described herein. Regardless of the mounting of the handle 10, the key slot 30 should not be blocked.

FIGS. 1-3 illustrate one method of attaching the handle 10 to the ignition switch 22, i.e., by drilling holes in the flanges 24 and threading screws 26 into the holes 18 of the handle 10. As will be evident to those of skill in the art, other structure for attaching the handle 10 to the ignition switch 22 can be used, such as rivets or clamps. The handle 10 could also be attached to the ignition switch 22 by drilling and tapping screw holes therein, whereby the flanges 24 could be eliminated. Alternatively, the handle 10 may be constructed to fit over the key 28 without the requirement of permanent attachment.

In operation, ignition key 28 is inserted into the key slot 30 of the ignition switch 22. The driver then grasps the knob 16 of the handle 10 and turns it in the proper direction, such as the direction indicated by the arrow in FIG. 2. The handle 10 transmits rotational forces from the driver's hand to the ignition switch 22. The rotation of the ignition switch 22 can then actuate the proper electrical contacts to start the motor vehicle.

A handicapped person thus receives significant assistance in starting a motor vehicle through the use of the ignition switch handle 10. The person has a much larger object to grasp than the small key 28 or the flanges 24 provided with the motor vehicle. The significant size of the ignition switch handle 10 and the amount by which it extends beyond the ignition switch 22 enables a person of limited manual dexterity to operate a motor vehicle ignition switch with relative ease. Moreover, excessive force is not exerted against the key 28 while the flanges 24 are rotated. The key 28 may be easily removed and replaced at will without removing the present aid.

While the above invention has been described with respect to one embodiment shown in the illustrations, it will be understood that the invention is not limited to the embodiment disclosed, but is intended to embrace any alternatives, modifications, and rearrangements or substitutions of parts and/or elements as fall within the spirit and scope of the invention.

What is claimed is:

1. An apparatus for facilitating the starting of a motor vehicle having an ignition switch with a rotatable key receiving member, the rotatable key receiving member having a slot for insertion of an ignition key and flanges protruding therefrom on opposed edges of the slot, comprising:

a lever arm with a first end for being grasped and a second end for being mounted to the flanges of the rotatable key receiving member, said lever arm further comprising a substantially straight portion dimensioned for abutting the flanges of the rotatable key receiving member without preventing insertion and withdrawal of the key into the slot therein and further including an angled portion extending outwardly to said first end; and means for removably securing said lever arm to each of the flanges of the rotatable key receiving member such that said first end is disposed a prescribed distance from the ignition switch wherein rotation of said lever arm causes rotation of the ignition switch to start the motor vehicle.

2. The device in claim 1 and further comprising a knob attached to said first end of said lever arm.

3. The device in claim 1 wherein said securing means comprises screws.

* * * * *